July 4, 1950
C. B. HOBBS
2,514,281
HOLDER FOR WIENERWURSTS, FRANKFURTERS, AND
OTHER SIMILARLY SHAPED FOOD PRODUCTS
Filed April 5, 1948
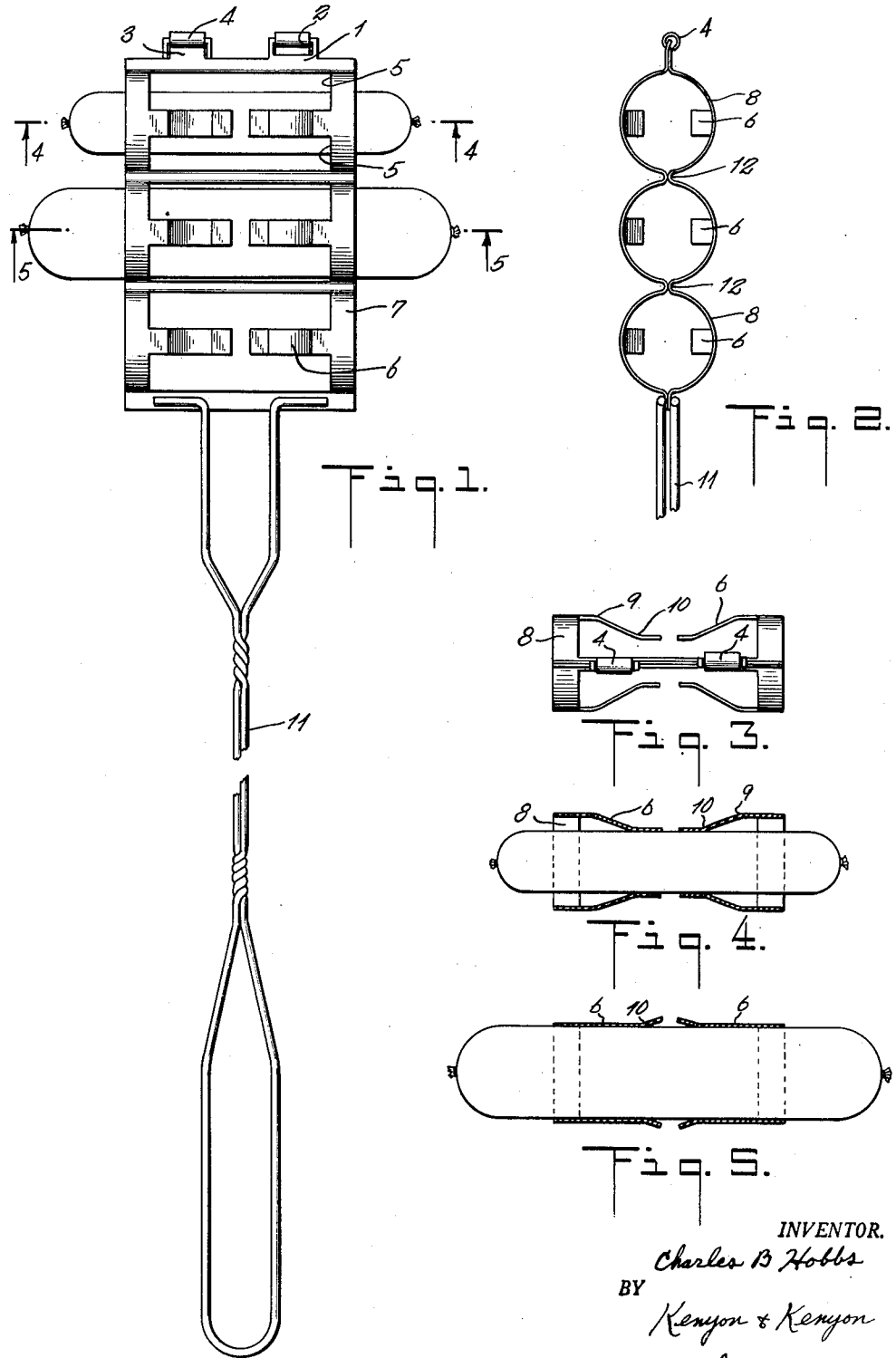
INVENTOR.
Charles B Hobbs
BY
Kenyon & Kenyon
ATTORNEYS Patented July 4, 1950

2,514,281

UNITED STATES PATENT OFFICE 2,514,281

HOLDER FOR WIENERWURSTS, FRANK-FURTERS, AND OTHER SIMILARLY SHAPED FOOD PRODUCTS

Charles B. Hobbs, Decatur, Ill., assignor to U. S. Manufacturing Corporation, Decatur, Ill., a corporation of Illinois Application April 5, 1948, Serial No. 18,978

4 Claims. (Cl. 99—394)

This invention is concerned with a holder for wienerwursts, frankfurters and similarly shaped food products. For example, it might also be useful for finger buns or other products that are not made from meat but do have long shapes.

One object is to provide a holder for firmly holding food products in long shapes and of varying thicknesses. The main idea is to provide a handy device for picnickers and the like, with the holder provided with long handles so it may be conveniently used as a broiler or toaster over an open fire. However, the holder might be useful whenever relatively soft, sausage-like shapes, of varying diameters, must be held.

A specific example of a long-handled broiler, embodying the principles of the invention in what is at present considered the best form, is illustrated by the accompanying drawings, in which:

Fig. 1 is a top view of the broiler;
Fig. 2 is a side view of the holder part of Fig. 1;
Fig. 3 is an end view of Fig. 1; and
Figs. 4 and 5 are cross sections taken respectively from the lines 4—4 and 5—5 in Fig. 1.

The holder, embodied by the illustrated broiler, comprises two superimposed, individually integral, sheet metal pieces. These may be stamped from single rectangular pieces of sheet metal, such as sheet steel or aluminum. Both pieces are exactly alike so that only one set of dies is needed.

Each piece has a rectangular ear 1 projecting from one end on one side of its longitudinal center line, with this ear provided with a rectangular opening 2. Each piece also has, on the same end but on the opposite side of the longitudinal center line, a projecting tongue 3 that is suitably dimensioned for passage through the opening 2, of the ear of the respectively opposite piece, and subsequent bending to provide a loop 4 around the end of the ear. The ear and tongue are symmetrical respecting the mentioned center line, so that, when the two identical parts are superimposed, the tongue of each may be thrust through the opening in the ear of the other and looped, whereby to interhinge the two pieces together in the manner of a book.

The two identical sheet-metal pieces have portions removed to define long openings 5 arranged transversely to the pieces' swinging direction, defined by the interhinging action, and successively spaced away from their interhinging ends. Since the two pieces are made exactly alike, the openings 5 register when the pieces are superimposed. The openings 5 may be formed by a stamping operation simultaneously providing the ear 1 and tongue 2 of each piece.

The openings 5 leave strips 6 remaining, and these strips extend transversely to the swinging direction of the interhinged pieces. Also the openings leave longitudinally extending, parallel and laterally spaced, side strips 7.

The side strips 7 are each formed, by simple bending, to provide a succession of outward loops 8, three loops being illustrated. In each piece the loops in one of the strips 7 are arranged in transverse registration with the loops in the other strip, and each loop is preferably substantially semi-circular. Since the frames are alike, when two are interhinged, as illustrated, with the loops of each extending outwardly, the loops register when the two frames are superimposed. Thus they are mutually opposite. The radius of each of the loops 8 may be made to equal, or slightly exceed, the radius of the thickest of a series of food products of varying thicknesses. Approximately a $\tfrac{9}{16}''$ radius is suggested when the device is designed for wienerwursts and frankfurters. The loops 8 are formed centrally of the strips 6, in each instance, and define passages, in alignment with the strips 6, for receiving the food products.

Each of the strips 6 is severed along the longitudinal center line of each frame to provide oppositely extending fingers. These fingers are bent downwardly at 9 and then reversely at 10 to provide these fingers with oppositely extending flat plane ends. The bends 9 and 10 are made so that the flat ends of the fingers, of two superimposed frames, are brought a little closer together than the thickness of the thinnest food product that is ordinarily commercially available and of the type for which the device is designed.

Preferably the bends 9 and 10 and the loops 8 are made by a cold forming operation so that the bent portions are cold worked to increase their elastic limit. In any event, the metal used should have a high enough elastic limit to cause the fingers 6 to be continuously biased inwardly and to be radially displaceable by the thickest food product, contemplated by the design, without material permanent deformation. This may be done by using sheet metal of the proper temper. However, it is to be noted that it is not much trouble to bend the fingers back in again should they become permanently bent outwardly too far, providing the metal is sufficiently ductile. If this is not considered objectionable, the metal may be of lower temper than suggested.

When the holder is used for broiling or toasting, the ends of the two frames, remote from their interhinging ends, may be provided with long handles 11. These handles may be made of intertwisted wire providing looped handle ends and may have their other ends brazed or welded to the frame. Then when the handles are swung apart the two frames are swung open, and when the two handles are brought together and held the frames are held together.

Throughout the commercial range of a given type of food product thicknesses any piece of the food product may be placed in any of the transverse passages when the frames are swung apart. When the frames are swung together the flat ends of the various fingers engage the food products and position them in the passages. The gauge of the sheet metal used should preferably be adequate to cause the fingers to have sufficient elasticity to make their flat plane ends at least slightly flatten the food products, or other soft objects, to provide flat-plane contacts. This keeps the objects from wobbling about regardless of whether they contact the loops 8. The fingers should not be so strongly elastic that they rupture the skins or surfaces of the food products, and this should be kept in mind when selecting the gauge. The strip width and the sheet metal gauge should be corelated respecting the particular metal's modulus of elasticity, to obtain the effects noted.

The flat, longitudinal strips 7, providing the loops 8, receive transverse, outwardly directed torque when the fingers provided by the severed strips 6 are displaced outwardly by the engaged objects. This tends to twist these strips outwardly. The severed openings 5, in addition to leaving the transverse strips 6, may be arranged to also leave transverse strips 12 extending between the loops 8. The same forming operation, previously described, may be used to bend these strips 12 into outwardly facing channels of generally U-shaped sections and with sufficient flange depth to have a high resistance to bending. Therefore, the torque applied the frames' side strips 7, which is oppositely directed on each side of each frame, is balanced, or placed in opposition, one against the other by the stress transmitted through the relatively rigid channels into which the strips 12 are formed. This keeps the frame relatively rigid even when the holding fingers are displaced their maximum distances. These sheet-metal strip channels 12 may be arranged to interconnect the loops at their bases so they perform the additional function of providing abutments for the loop bases, on the opposite frames, when the frames are pressed together by the handles 11 being pressed together.

The drawings illustrate a relatively thin frankfurter being held in the passage closest the interhinged ends. Fig. 4 illustrates the appearance in section. They also show a much thicker or fatter frankfurter held in the next adjacent passageway, Fig. 5 showing the appearance of this in cross section. As shown particularly well by Fig. 1, the main portions of the frankfurters are always exposed so that they may be properly heated over a fire.

If the sheet metal used in making the holder is tin plate or aluminum, the holder will look better during merchandising. However, by using steel black plate better heat absorbing characteristics are obtained. That is to say, the metal frame absorbs the heat from the fire more rapidly and can therefore heat the grasped portions of the food, by direct conduction, at approximately the same rate that the remainder of the food surfaces are heated, by heat radiation from the fire. Blued steel, black plate has much the same advantage and is not so easily subject to rusting.

It is now obvious that in spite of the attention paid to the mechanical features and thermal characteristics, a device constructed in accordance with this disclosure may be made very inexpensively. A single set of combination stamping and forming dies may be used to simultaneously strike out a frame, with all the described parts, by a single operation. Then identical frames, produced by successive stampings, may be superimposed with the tongue 3 of one thrust through the ear 2 of the other in each instance, the formation of the loops 4 keeping them interhinged and completing the assembly of the holder per se. The formation of the handles 11 is an easy and inexpensive job, and their attachment by brazing or spot welding serving to finish the device in the form ready for merchandising and use. The handle wire may be steel or aluminum, and the handles may be mechanically attached to the frames if desired. By doing the work cold, the cold work strain placed in the various loops and bends, in the frames, raises the elastic limit of the metal to give the various parts the proper spring action to perform their intended functions satisfactorily. If sheet metal of low temper is used, this cold work strain is of importance in giving the fingers the necessary elastic limit.

The device will be used primarily by picnickers and will receive hard service. However, due to the simplicity of the parts, should any of the food product holding fingers become permanently displaced it is an easy and simple operation to bend them back into place.

I claim:

1. A holder for cooking sausage-like shapes, said holder including two superimposed frames having laterally spaced side members formed into outward loops arranged so the loops of the respective members cooperatively define at least one transverse passage through the frames, a spring finger extending transversely and inwardly from each of said loops partially along said passage longitudinally thereof and having a flat end projecting into said passage and arranged to bear flatly against a shape therein, the flat ends of the respective fingers being mutually spaced; hinges interhinging said frames at one end so the frames can swing apart at the other end, and a handle projecting from said frames.

2. A holder for cooking sausage-like shapes, said holder including two superimposed frames having laterally spaced side members formed into outward loops arranged so the loops of the respective members cooperatively define at least one transverse passage through the frames, a spring finger extending transversely and inwardly from each of said loops partially along said passage longitudinally thereof and having a flat end projecting into said passage and arranged to bear flatly against a shape therein, the flat ends of the respective fingers being mutually spaced; hinges interhinging said frames at one end so the frames can swing apart at the other end, and a handle projecting from said frames, said side members being formed from flat strip material arranged generally parallel to said passage so that spring deflection of said fingers by the shape causes twisting of said side members, said frames each having rigid cross pieces transversely interconnecting the ends of the loops formed in said side members and restraining said side members from said twisting.

3. A holder for cooking sausage-like shapes, said holder including two superimposed frames having laterally spaced side members formed into outward loops arranged so the loops of the respective members cooperatively define at least one transverse passage through the frames, a spring finger extending transversely and inwardly from each of said loops partially along said passage longitudinally thereof and having a flat end projecting into said passage and arranged to bear flatly against a shape therein, the flat ends of the respective fingers being mutually spaced; hinges interhinging said frames at one end so the frames can swing apart at the other end, and a handle projecting from said frames, the interhinged end of each frame being formed by a flat strip cross piece arranged substantially parallel to the corresponding cross piece of the other frame and in each instance formed to provide rectangular loops and tongues projecting longitudinally from the frame in the same arrangement respecting each frame and with the tongues bent through and around the ends of the loops to provide said hinges.

4. A holder for cooking sausage-like shapes, said holder including two superimposed frames having laterally spaced side members formed into outward loops arranged so the loops of the respective members cooperatively define at least one transverse passage through the frames, a spring finger extending transversely and inwardly from each of said loops partially along said passage longitudinally thereof and having a flat end projecting into said passage and arranged to bear flatly against a shape therein, the flat ends of the respective fingers being mutually spaced; hinges interhinging said frames at one end so the frames can swing apart at the other end, and a handle projecting from said frames, said side members being formed from flat strip material arranged generally parallel to said passage so that spring deflection of said fingers by the shape causes twisting of said side members, said frames each having rigid cross pieces transverely interconnecting the ends of the loops formed in said side members and restraining said side members from said twisting, the interhinged end of each frame being formed by a flat strip cross piece arranged substantially parallel to the corresponding cross piece of the other frame and in each instance formed to provide rectangular loops and tongues projecting longitudinally from the frame in the same arrangement respecting each frame and with the tongues bent through and around the ends of the loops to provide said hinges.

CHARLES B. HOBBS.

REFERENCES CITED

The following references are of record in the file of this patent:

UNITED STATES PATENTS

| Number | Name | Date |
|---|---|---|
| 1,832,854 | Blier | Nov. 24, 1931 |
| 1,945,165 | Smith | Jan. 30, 1934 |
| 1,965,638 | Gerhardt | July 10, 1934 |
| 1,973,817 | Lang | Sept. 18, 1934 |